United States Patent Office 3,474,728
Patented Oct. 28, 1969

3,474,728
PRINTING BLOCKS OF SOLID PLASTIC MATERIAL
Hans-Joachim Lenz and Diethard Benkel, Lorsbach, Taunus, Germany, assignors to Farbwerke Hoechst Aktiengesellschaft vormals Meister Lucius & Bruning, Frankfurt am Main, Germany, a corporation of Germany
No Drawing. Continuation-in-part of application Ser. No. 373,857, June 9, 1964. This application Oct. 5, 1967, Ser. No. 673,009
Claims priority, application Germany, June 12, 1963, F 39,969
Int. Cl. B41n *1/00;* B41l *13/00;* B41b *1/02*
U.S. Cl. 101—395                                          3 Claims

ABSTRACT OF THE DISCLOSURE

Printing plates or similar printing surfaces are produced when a polyoxymethylene surface is blocked in image areas with an acid resistant varnish and the varnish-free areas are etched with a strong mineral acid such as sulfuric acid. The obtained surfaces are characterized by excellent hardness, high scratch resistance, low degree of abrasion, and dimensional stability independent of atmospheric moisture as well as resistance to solvents. These surfaces produce very sharp prints even after long printing runs.

---

This application is a continuation-in-part of application Ser. No. 373,857 filed June 9, 1964, now abandoned.

The present invention provides a process for preparing blocks of plastic material.

Since plastic materials have good mechanical properties and are resistant to corrosion, many attempts have been made to use them for the preparation of printing blocks or plates. In particular polyvinyl chloride and polyamides have been used for practical purposes. However, the plastic materials used have various drawbacks.

Polyvinyl chloride, for example, is not resistant to all solvents contained in printing pastes and, consequently, the blocks prepared from it cannot be used in every case. Polyamides have the drawback to absorb atmospheric moisture. Since in polyamides water acts as a plasticizer, the degree of softness and the dimensions of printing blocks or plates made from polyamides change according to the content of moisture of the air. Moreover, prior art printing plates whereby a plastic material is selectively dissolved are unsatisfactory; and for this reason, the resultant plate possesses a number of drawbacks. Still further, many of the plastic materials are incapable of being acid etched for purposes of producing well defined images as these materials will often swell and/or react nonuniformly with the acid.

Now we have found that blocks of plastic material that do not have the aforesaid drawbacks can be prepared by a process according to which the image to be printed is worked out of a plate or another shaped article of polyoxymethylene or a copolymer of formaldehyde or trioxane with a formal or a cyclic ether by etching the plate or other shaped article by means of an acid.

Besides polyoxymethylene, copolymers containing 90 to 99% by weight of trioxane and 10 to 1% by weight of a cyclic formal or a cyclic ether, for example, diglycol formal, dioxolane, butane diol formal, tetrahydrofurane or alkylene oxide containing 2 to 10 carbon atoms, may be used as material for carrying out the process of the invention.

After the desired printing images have been covered with an acidproof varnish, an intense etching can be brought about by the action of a strong acid, for example, concentrated sulfuric acid, i.e., of 96% strength or hydrochloric acid. Within one hour etchings having a depth of 0.3 to 0.5 millimeter are obtained. When sulfuric acid of 80% strength is used, the etching time is 1.5 to 2 times as long and when sulfuric acid of 65% strength is used, it is 3 times as long. When an acid of a lower concentration is used, very weak etchings can be obtained as are required, for example, for screens. Besides sulfuric acid, other inorganic and strong organic acids are effective.

With the acidproof varnishes, drawings can be made directly on the block material. Other known methods of transmission, for example, a photo-mechanical transmission, may also be applied. According to the desired depth of etching, the etching may be carried out in one or several operations.

The blocks that have thus been prepared have an excellent hardness, a good toughness, a high scratch resistance and a low degree of abrasion. Their dimensional stability is independent of the atmospheric moisture. Owing to their flexibility, thin plates may be laid around cyclinders as is usually done in flexography. The hardness of the material enables very sharp prints to be obtained.

The blocks that had thus been prepared had the following properties:

| | Test Method | Dimensions |
|---|---|---|
| Indentation hardness | DIN 53,456 [1] | 1,300 kp./cm.$^2$ |
| Stiffness in torsion at 20° C | DIN 53,447 | 8,200 kp./cm.$^2$ |
| Compressive strength by 10%, compressive strain at 23° C | ASTM D 695–63T | 1,120 kp./cm.$^2$ |
| Abrasion, CS–17-wheel, 100 g. load | ASTM D 1044 | 6 mg./1000 rotations. |
| Water absorption of a moulded plate x 50 x 1 mm. after 96 hours in water at 20° C | DIN 53,472 | 20 mg. |

[1] DIN = German Industrial Standard.

The etching process also enables very fine lines or characters to be transmitted. Printing tests carried out on an etched screen having 60 lines per centimeter, provided prints of a high quality. For judging the quality of the prints, a 12-grade reflector grey scale and a 20-grade direct-vision grey scale were used according to DIN 16,543 and the degree of blackening was measured with the aid of a densitometer. The resistance to solvents is very good. Blocks of polyoxymethylene or copolymers of trioxane can be used practically with all printing inks.

The following examples serve to illustrate the invention, but they are not intended to limit it thereto.

EXAMPLE 1

A plate of polyoxymethylene having a thickness of 3 millimeters was covered with characters while simultaneously its sides were covered with an acidproof bitumen varnish obtained by dissolving asphalt in higher boiling hydrocarbons. The plate was then etched for half an hour with sulfuric acid of 80% strength. After the covering varnish has been removed, the contours remained neat and sharp. The block thus obtained could be used in the same manner as a metal block, but owing to its good resistance to corrosion, it required no attendance.

EXAMPLE 2

An acidproof copying varnish of a polyvinyl alcohol containing potassium dichromate as a sensitizing agent for hardening the material was used to obtain an image area. It was applied to an extruded plate of a copolymer of 98% by weight of trioxane and 2% by weight of ethylene oxide, which had a thickness of 1 millimeter. After exposure to light and development, a preliminary etching was carried out with sulfuric acid of 65% strength. The block was then covered again with an appropriate bitumen varnish and etching was continued with sulfuric acid of 80% strength. Since the flexible plate could be laid without any difficulty around a printing roller, it could be used for flexography. By a very weak overetching, the projecting contours were roughened too, whereby the absorption of printing ink was improved.

As indicated above, the present printing blocks or plates possess excellent properties, completely nonobvious in view of the behavior of the diverse plastic materials which are unsuitable for one or a multiple of reasons.

We claim:

1. As an article of manufacture, a printing plate of a homopolymer or a copolymer of polyoxymethylene having an etch defined image area having at least the following properties: indentation hardness, 1,300 kp./cm.$^2$; stiffness in torsion at 20° C., 8,200 kp./cm.$^2$; compressive strength by 10%, compressive strain at 23° C., 1,120 kp./cm.$^2$; abrasion resistance, CS–17 wheel, 100 g. load, 6 mg./1,000 rotations; water absorption resistance of a molded plate 50 x 50 x 1 mm. after 96 hours in water at 20° C., 20 mg.

2. The article of manufacture according to claim 1 wherein the copolymer of polyoxymethylene is of recurring units of formaldehyde or trioxane and a formal or a cyclic ether.

3. The article of manufacture according to claim 1 wherein the etch defined image area has slightly roughened projecting contours.

References Cited

UNITED STATES PATENTS

| | | | |
|---|---|---|---|
| 1,788,594 | 1/1931 | Robinson et al. | 101—401 |
| 3,027,352 | 3/1962 | Walling et al. | 260—67 |
| 3,060,023 | 10/1962 | Burg et al. | 101—395 X |
| 3,248,271 | 4/1966 | Reilly et al. | 156—2 |

FOREIGN PATENTS 742,754  12/1943  Germany.

ROBERT E. PULFREY, Primary Examiner

F. FREI, Assistant Examiner

U.S. Cl. X.R.

101—127, 401, 401.1; 156—2, 14; 161—411; 260—67; 264—129, 132